May 3, 1932. A. F. GERDES 1,856,383

FRICTION WHEEL DIFFERENTIAL GEAR

Filed Dec. 20, 1928

Inventor
Adolf Friedrich Gerdes

Patented May 3, 1932

1,856,383

UNITED STATES PATENT OFFICE

ADOLF FRIEDRICH GERDES, OF BERLIN, GERMANY

FRICTION-WHEEL DIFFERENTIAL GEAR

Application filed December 20, 1928, Serial No. 327,274, and in Germany December 23, 1927.

This invention relates to a controlling device with variable speeds for friction-wheel differential gears, in which the driving wheel and the driven wheel are axially journalled the one with regard to the other and in which the transmission wheels, swinging in axial direction, communicate with the driving- and the driven wheels, said transmission wheels being mounted on spindles pivotally supported on the driven shaft serving as lifters for the working shaft. With this invention the speed (circulating speed of the working shaft) is varied through the axial displacement of the driving wheel and the driven wheel, for which purpose each of said wheels communicates with a lever arm, both of which lever arms communicate with one another with the aid of a connecting rod. Said connecting rod is provided with spiral pressure springs at both extremities but outside the two lever arms. Within the interval between the two lever arms carrying said connecting rod and in proximity thereto abutment rings or collars are provided on the rod. When using rotating wheel bodies of one curve, the tangents to the centre axis of which are all of equal lengths, a perfect and reliable rolling is secured; however, such relationship cannot be maintained when, for the purpose of speed variation, axially shifting of the driving- and driven wheels takes place, all in maintaining the equal distance between said two wheels.

With the object of the present invention, this difference is compensated by pressure springs on the connecting rod and in case of necessity, in regulating the pressure of said springs by means of a cap screw provided on said connecting rod. Said springs hold the axial displacement under pressure. The abutment rings of the connecting rod serve the positive movement of the levers. The rotation of the driving wheel and of the driven wheel in opposite direction with regard to one another can be produced by corresponding rotation of the working shaft or it may be produced by toothed wheels axially journalled with regard to the gear. In both cases the present invention respectively the device, has the functions of a differential gear with which the working shaft may be adjusted to "forward movement", "idle running" and "backward movement".

When providing, at a determined place, one of the lever arms controlling the axial displacement, with a foot pedal, which latter is pivotally journalled under pressure, and when using the improved device with motor cars, the driver can easily regulate the speed with the foot.

Two forms of execution of the improved device are shown, by way of example, on the accompanying drawings, wherein—

Figure 1:
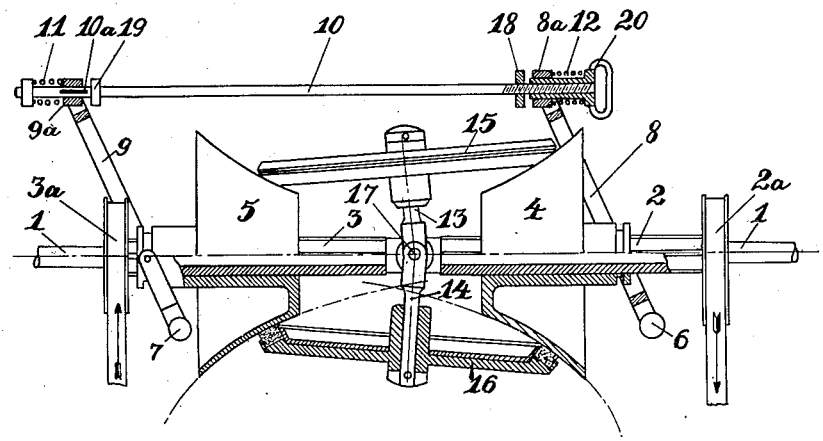
Fig. 1 shows a lateral elevation of the first embodiment, partly in section.

Referring to Fig. 1, the hollow shafts 2 and 3 having guide facings are rotatably journalled on the main shaft 1. Said hollow shafts are driven in opposite directions by their respective pulleys 2a and 3a, and simultaneously therewith the bevelled hollow wheels 4 and 5 mounted on said hollow shafts. Said two hollow bevelled wheels have curved friction surfaces. The pivotal lever arms 8 and 9, having their fulcrum points at 6 and 7, communicate by means of flange wheel guiding with the bevelled hollow wheels 4 and 5, said lever arms being coupled the one with the other by means of the connecting rod 10 on which the latter, pressure spiral springs 11 and 12 are mounted. On the main shaft 1 between the hollow bevelled friction wheels 4 and 5 spindles 13 and 14, carrying the transmission wheels 15 and 16, are pivotally mounted in axial direction by means of the joint pin 17. Said transmission wheels 15 and 16 are provided with a beveled friction edge surface engaging with the curved surfaces of the friction wheels.

The connecting rod 10, which is prevented from rotating but which can be displaced in axial direction by means of the guide pin 10a extending into a small longitudinal groove, is journalled in bearings 8a and 9a of the lever arms 8 and 9. Within the interval between said lever arms 8 and 9 the connecting rod is provided with abutment rings 18 and 19 in proximity to said lever arms, whilst the right hand end of said connecting rod is provided with a screw thread onto which screw cap 20 is screwed; the end of said screw cap 20 extends into the bearing 8a of the connecting rod. By turning said screw cap 20 the spring-controlled pressure is regulated. The opposite end of the connecting rod is provided with a fixed collar or abutment ring, against which the spiral spring 11 butts.

Figure 2:
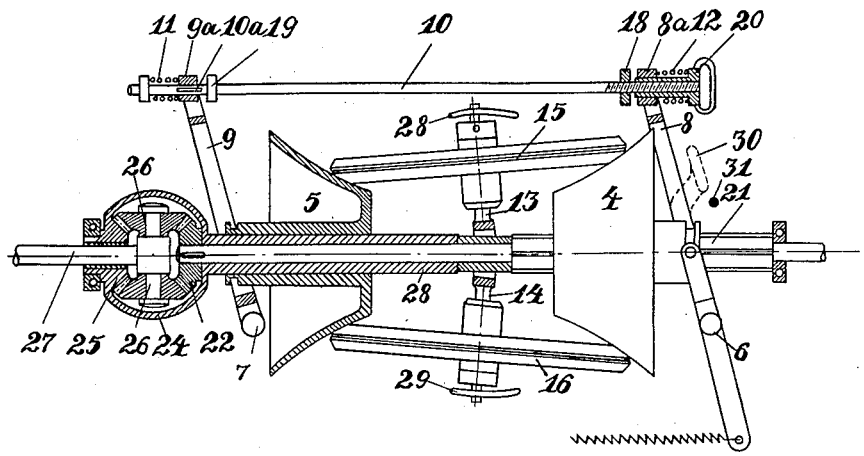
Fig. 2 shows a lateral elevation of the second embodiment, partly in section.

According to Fig. 2 the driving shaft 21, partly provided with guide facing, communicates with the sun wheel 22, and the hollow cylindrical extension 23 of the gear casing 24, upon which the hollow beveled friction wheel 5 is mounted, communicates with the sun wheel 25. The sun and planet wheel gear 22, 25, 26 is composed of the sun wheels 22 and 25 and of the planet star 26, which latter rotates the working shaft 27. The journals or spindles 13 and 14 are held against swinging by means of the longitudinal guide grooves 28 and 29.

If now the connecting rod 10 is displaced, whereby the hollow bevel wheels 4 and 5 are axially shifted on their support, the transmission in the friction wheel gear will be altered through the alteration of the active diameters of the hollow bevel wheels 4 and 5 with curved contact surfaces, transmitting the varied speed, according to Fig. 1 onto the driving- and receiving shaft 1, and according to Fig. 2 onto the planet star 26 and consequently to the receiving shaft 27 communicating therewith.

The position of the lever arms 8 and 9 can be regulated by rotation of the screw cap 20 in the one or other direction.

When the improved device is used, for instance with motor cars, a pivotally journalled foot pedal 30, under spring action, would have to be mounted as shown in Fig. 2 of the annexed drawings, whereby care has to be taken, that an abutment pin 31, be arranged, also under spring action, in proximity of said pedal at such previously calculated place corresponding to the position of "idle running" of the improved device.

I claim:—

1. A friction wheel differential gear including a driving friction wheel, a driven friction wheel, means for communicating motion from one to the other with a system of articulated levers communicating with the driving friction wheel, a system of articulated levers communicating with the driven friction wheel, both friction wheels being axially shiftable, bearings in the free ends of two main lever arms of said two systems of articulated levers, a connecting rod under spring control carried in said bearings connecting both systems of articulated levers in such manner that the rod is prevented from rotating but is allowed to displace itself in longitudinal direction, abutment rings on said connecting rod within the interval between the two lever arms carrying the connecting rod and in proximity to said arms, a screw thread on the free end of said connecting rod, and a screw cap, under spring control, screwed onto said screw thread of the connecting rod, said screw cap extending into the bearing of the connecting rod, producing by axial displacement of said connecting rod the simultaneous axial displacement of the two axially shiftable friction wheels for positive directional and speed variations.

2. A friction wheel differential gear as claimed in claim 1 in combination with means for actuating the speed variations and directional variations with the foot.

3. A friction-wheel differential gear comprising a driving shaft, and a driven shaft, a friction wheel mounted on each shaft and rotating therewith but shiftable in axial direction, one of said wheels being the driving wheel, the other being the driven wheel, the friction surfaces of which are curved, means for rotating the driven friction wheel in a direction opposite to the driving wheel, and differential means between said friction wheels and cooperating with the latter for producing positive directional and speed variations, said differential means including oppositely disposed transverse spindles, and a transmission wheel loosely mounted on each of said spindles and having a bevelled frictional edge surface engaging with the curved surfaces of the friction wheels.

4. A friction-wheel differential gear comprising a driving shaft, and a driven shaft, a friction wheel mounted on each shaft and rotating therewith but shiftable in axial direction, one of said wheels being the driving wheel, the other being the driven wheel, the friction surfaces of which are curved, means for rotating the driven friction wheel in a direction opposite to the driving wheel, and differential means between said friction wheels and cooperating with the latter for producing positive directional and speed variations, said differential means including oppositely disposed transverse spindles, and a transmission wheel loosely mounted on each of said spindles and having a bevelled frictional edge surface engaging with the curved surfaces of the friction wheels, in combination with means communicating with the driving friction wheel and the driven friction wheel for axially shifting the said wheels.

5. A friction wheel differential gear including a main shaft, friction wheels slidably arranged thereon for free rotation relative thereto, each of said wheels having a friction surface of varying diameter axially of such wheel, means whereby the wheels may be moved axially of the main shaft, and driving elements cooperating with the friction surfaces of both wheels and movably supported by the main shaft to insure driving cooperation with such friction surfaces in any adjusted position of the friction wheels.

6. A friction wheel differential gear including a main shaft, hollow shafts mounted for sliding movement on the main shaft, a friction wheel fixed with relation to each hollow shaft, said friction wheels each having a friction surface of varying diameter axially of the wheel, a plurality of spindles supported on the main shaft, a transmission wheel mounted on each spindle and having cooperation with the friction wheels, and means for adjusting the hollow shafts longitudinally of the main shaft to thereby vary the cooperation of the transmission wheels with the friction wheels.

In testimony whereof I affix my signature.

ADOLF FRIEDRICH GERDES.